United States Patent [19]

Carrier

[11] Patent Number: 5,242,520

[45] Date of Patent: Sep. 7, 1993

[54] METHOD AND DEVICE FOR APPLYING THREADS ON A SUPPORT USING A DRUM WITH ROWS OF FIXED AND MOVABLE TEETH

[75] Inventor: Gilles Carrier, Ennezat, France

[73] Assignee: Compagnie Generale des Etablissements Michelin - Michelin & Cie, Clermont-Ferrand, France

[21] Appl. No.: 775,712

[22] Filed: Oct. 11, 1991

[30] Foreign Application Priority Data

Oct. 22, 1990 [FR]  France ................................ 90 13157

[51] Int. Cl.$^5$ ............................................. D04H 3/05
[52] U.S. Cl. ..................... 156/177; 156/178; 156/439; 156/440; 28/102
[58] Field of Search ............... 156/117, 177, 178, 179, 156/397, 440, 169, 181, 439; 152/527, 533; 28/102, 103; 66/84 R, 84 A

[56]  References Cited

U.S. PATENT DOCUMENTS

| | | | |
|---|---|---|---|
| 2,606,133 | 8/1952 | Havens | 156/197 |
| 2,828,795 | 4/1958 | Harstein | 156/440 |
| 4,056,420 | 11/1977 | Adams | 156/181 |
| 4,080,232 | 3/1978 | Friedrich | 156/178 |
| 4,276,106 | 6/1981 | Porter | 156/181 |
| 4,820,143 | 4/1989 | Evoskey et al. | 156/440 |
| 4,981,542 | 1/1991 | Carrier | 156/177 |
| 5,002,621 | 3/1991 | Ikeda | 156/177 |
| 5,134,024 | 7/1992 | Carrier | 156/117 |

FOREIGN PATENT DOCUMENTS 2306063  10/1976  France .

Primary Examiner—Caleb Weston
Assistant Examiner—Robert W. Robey
Attorney, Agent, or Firm—Brumbaugh, Graves, Donohue & Raymond

[57]  ABSTRACT

A method and device (1) for applying threads (9) on a support (11) in order to obtain a ply (13) while imparting a sinuous form to the threads. There is used a rotary drum (2) having rows (4A) of fixed teeth (5A) and rows (4B) with movable teeth (5B) which are displaced parallel to the axis of rotation of the drum. Plies obtained with this method or device and articles incorporating such plies, such articles being, for instance, tires.

10 Claims, 5 Drawing Sheets

METHOD AND DEVICE FOR APPLYING THREADS ON A SUPPORT USING A DRUM WITH ROWS OF FIXED AND MOVABLE TEETH

BACKGROUND OF THE INVENTION

The present invention relates to devices and methods for applying threads on supports, particularly supports of plastic or rubber material, said devices and methods making it possible, for instance, to produce reinforcement plies, in particular reinforcement plies for tires. The invention relates, in particular, to methods and devices which make it possible to apply threads on a support imparting them a sinuous shape.

Devices which make it possible to apply threads on a support while giving them a sinuous shape are described, for instance, in the following patents or patent applications: FR 2 042 859, FR 2 325 497, FR 2 501 126, SU 704 816, WO 81/1151.

These devices have at least one of the following drawbacks:
  complicated nature of the devices resulting in frequent breakdowns or requiring costly and frequent maintenance;
  lack of precision in the placement of the threads so that the plies obtained have a heterogenous geometry and, therefore, physical properties which differ along their length.

EP Application A 318 791 describes a device for applying threads on a support using two pincers, a front pincer and a rear pincer as seen in the direction of advance of the support and of the threads, the device comprising means which make it possible to open and close the pincers, and means which make it possible to displace the rear pincer along the direction of advance or along a direction opposite the direction of advance, as well as means for displacing the threads in transverse directions. The device described in this application EP-A 318 791 makes it possible to deposit the threads with great precision, but the speed of deposition is relatively slow as a result of the complicated succession of movements of the pincers which make it necessary to stop the support upon transverse movements of the threads before they are applied to the support and upon the application of the threads to the support.

The object of the present invention is to overcome these drawbacks.

SUMMARY OF THE INVENTION

Accordingly, the method in accordance with the invention for applying a plurality of threads onto a support so as to obtain a ply, while imparting a sinuous shape to the threads, is characterized by the following features:
  a) a drum is used which is caused to turn around an axis;
  b) the drum comprises rows of teeth, each row being parallel to the axis of rotation of the drum and the rows all having the same number of teeth;
  c) every second row is such that its teeth are fixed, the other rows being such that their teeth are movable, in a direction parallel to the axis of rotation of the drum;
  d) the threads are brought into contact with the drum at a place where the fixed and movable teeth are substantially aligned in planes perpendicular to the axis of rotation of the drum, these planes being the same for the fixed teeth and the movable teeth, the threads being arranged parallel to said planes between pairs of teeth in the rows of fixed or movable teeth;
  e) the threads are carried along by the rotation of the drum and the movable teeth are displaced, they, in turn, displacing the threads in contact with them so as to impart a sinuous shape to the threads on the drum;
  f) the support is brought into contact with the drum and the threads at a place where the threads have substantially acquired their final sinuous shape on the drum;
  g) the ply formed by the support and the threads in contact with the support is removed from the drum.

The invention also relates to a device for applying several threads on a support in such a manner as to obtain a ply, while imparting the threads a sinuous shape, the device being characterized by the following features:
  a) it comprises a drum with means, referred to as "means of rotation", which make it possible to drive the drum in rotation around an axis;
  b) the drum comprises rows of teeth, each row being parallel to the axis of rotation of the drum, the rolls all having the same number of teeth;
  c) every second row is such that its teeth are fixed, the other rows being such that their teeth are movable and the device comprises means, referred to as "displacement means," which make it possible to displace the movable teeth of said other rows parallel to the axis of rotation of the drum;
  d) the device comprises means which make it possible to cause the thread to come into contact with the drum at a place where the fixed and movable teeth are aligned substantially in planes perpendicular to the axis of rotation of the drum, these planes being the same for the fixed teeth and the movable teeth, the threads being arranged parallel to said planes between pairs of teeth in the rows of fixed or movable teeth;
  e) the means of rotation and the displacement means are so arranged that the threads are driven along by the rotation of the drum and that the movable teeth are displaced, in their turn displacing the threads in contact with them so as to impart a sinuous shape to the threads on the drum;
  f) the device comprises means which make it possible to cause the support to come into contact with the drum and the threads at a place where the threads have substantially acquired their final sinuous shape on the drum;
  g) the device comprises means which make it possible to remove from the drum the ply formed of the support and the threads in contact with the support.

The invention also relates to the plies obtained with the method or device of the invention as well as articles incorporating said plies, such articles being, for instance, hoses, membranes, belts and tires.

The expression "thread" is to be understood in a very broad sense. A thread may be a "single thread" formed, for instance, of one or more filaments. When the single thread is formed of a single filament, it is referred to as a "mono-filament" and when the single thread is formed of several filaments, it is referred to as a "multi-filament".

A thread can, furthermore, itself be an assembly of single threads. By way of example, such an assembly is referred to as a "plied yarn" when it is formed of several individual threads combined by a single twisting operation, while such an assembly is referred to as "cabled" when it is formed of several threads at least one of which is a plied yarn, which are twisted together by one or more twisting operations.

The invention will be easily understood by reference to the non-limitative examples which follow and the diagrammatic figures relating to said examples.

Figure 1:
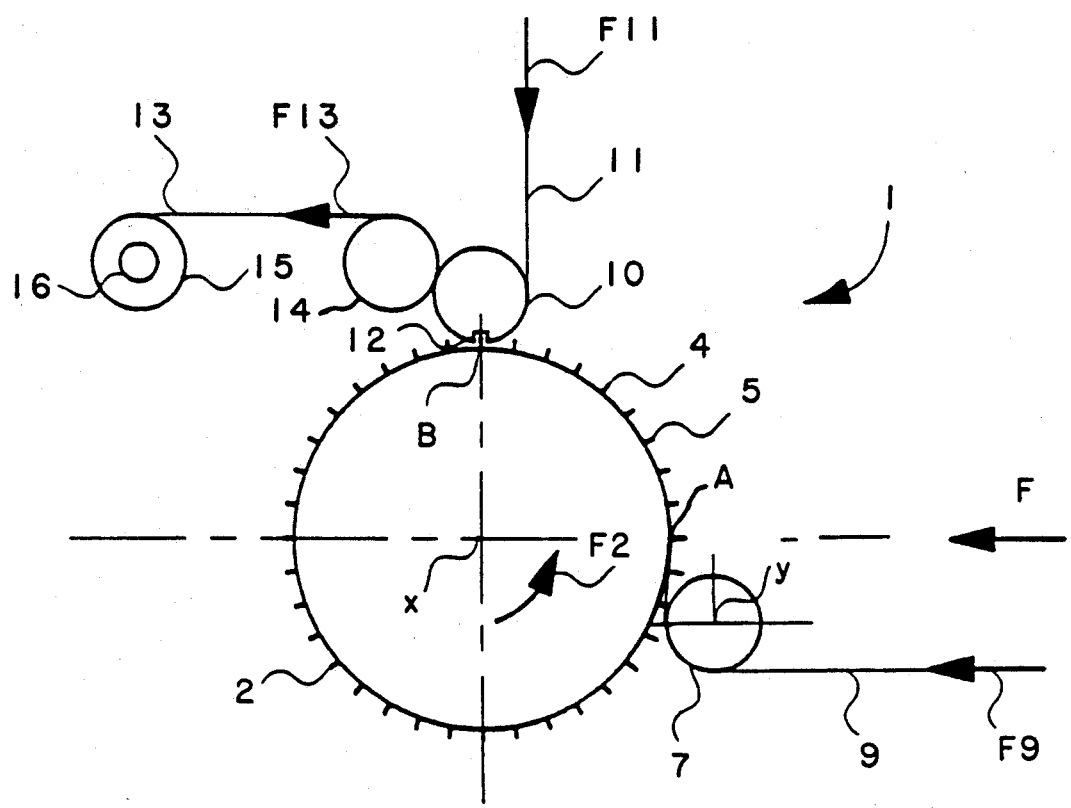
FIG. 1 shows in cross section a device in accordance with the invention.
Figure 2:
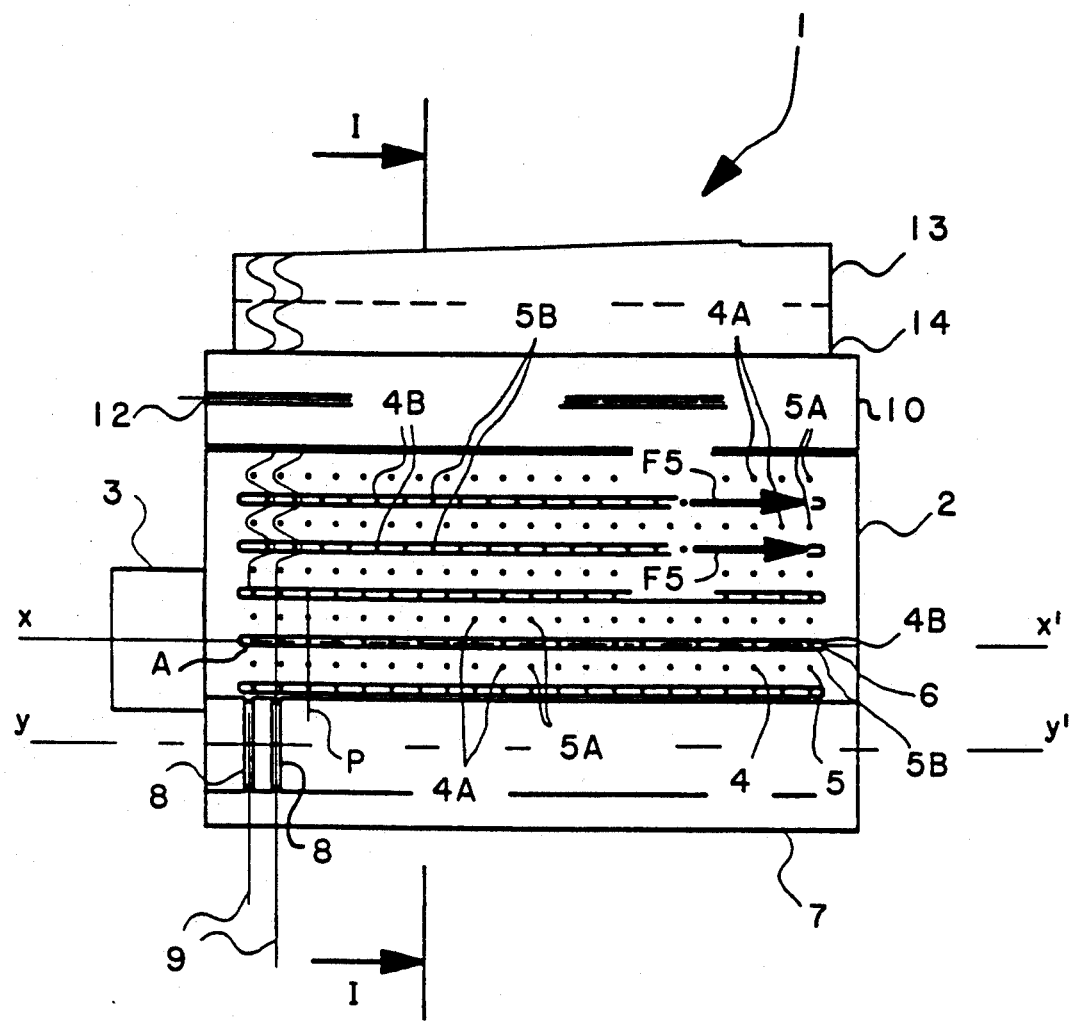
FIG. 2 shows, in side view in the direction indicated by the arrow F in FIG. 1, the device shown in FIG. 1, the section of FIG. 1 being diagrammatically indicated by the straight line segments I—I in FIG. 2.
Figure 5:
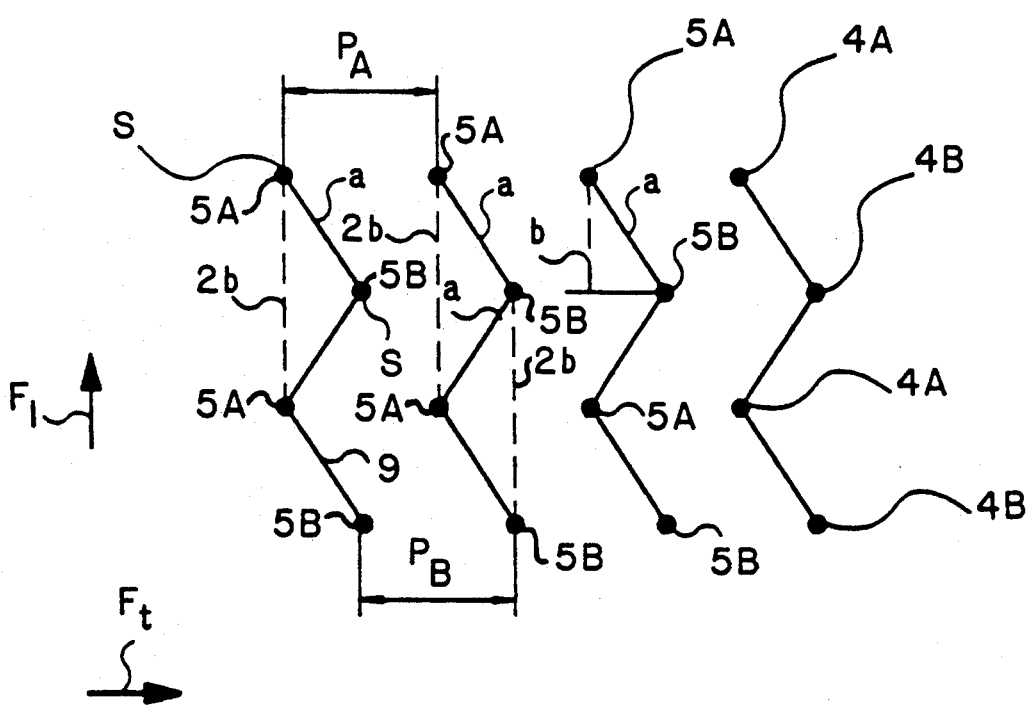
Figure 6:
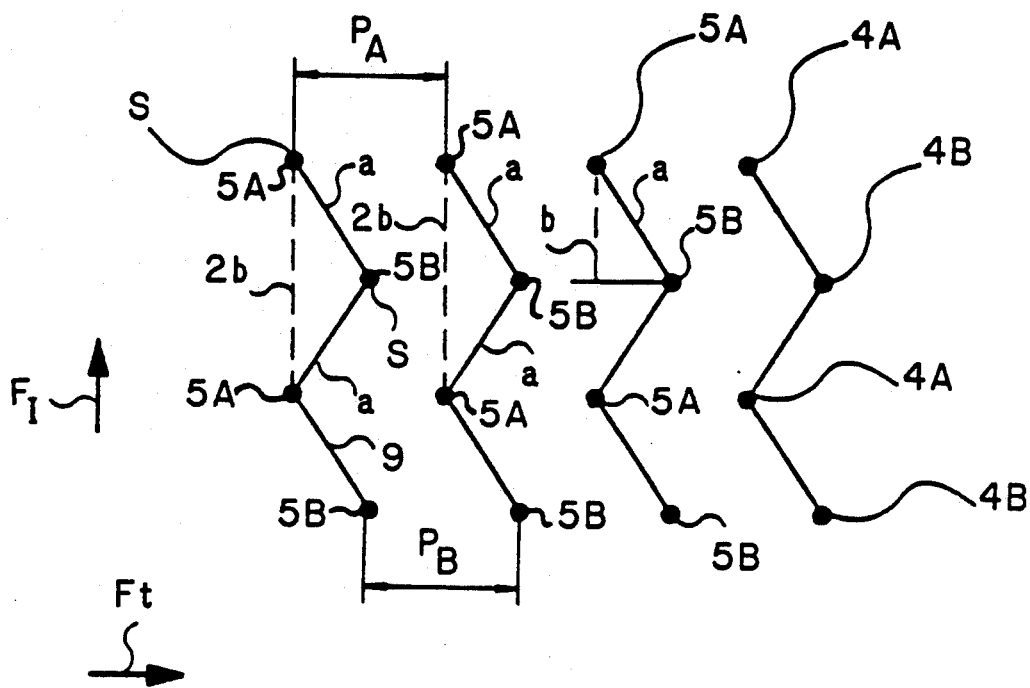

Each of FIGS. 5 and 6 shows an arrangement of the threads on the drum of the device shown in FIGS. 1 and 2.

DESCRIPTION OF INVENTION

FIGS. 1 and 2 show a device 1 in accordance with the invention. This device 1 comprises a drum 2 of generally cylindrical shape and a motor 3 which makes it possible to drive the drum 2 in rotation around the axis xx'. FIG. 1 is a section perpendicular to the axis xx', indicated by the letter x in said figure, and FIG. 2 is a side view, in the direction of the arrow F of FIG. 1, of the device 1.

The rotation of the drum 2 is diagrammatically indicated by the arrow F2 in FIG. 1. The drum 2 has rows 4 of teeth 5. Each of the rows 4 is parallel to the axis xx', that is to say, each of the rows 4 is directed along a generatrix of the cylinder 2. Every second row 4, designated 4A, is such that its teeth 5A are fixed and the other rows, marked 4B, have teeth 5B which can move parallel to the axis xx', that is to say, along a generatrix of the cylinder 2. The fixed teeth 5A are fastened directly on the drum 2, while the movable teeth 5B are arranged in grooves 6 in the drum 2, one groove 6 for each row 4B. The displacements of the movable teeth 5B are diagrammatically indicated by the arrows F5 in FIG. 2. The means permitting the displacement of the movable teeth 5B have not been shown in FIGS. 1 and 2, and they will be described in more detail below.

The device 1 comprises a roller 7 the axis yy' of which is parallel to the axis xx', said axis being represented by the letter y in FIG. 1. This roller 7 has grooves 8 on its periphery, the axis of rotation of the grooves 8 being the axis yy'. The roller 7 makes it possible to have threads 9 come in contact with the drum 2 and the teeth 5 of the rows 4. For this purpose, the threads 9 come from a known feed device, not shown in the drawing for purposes of simplification. Each of them passes within a groove 8 and arrives on the drum 2. The place where the threads 9 arrive in contact with the drum 2 is diagrammatically indicated by the letter A in FIGS. 1 and 2. At this place A, the fixed teeth 5A and the movable teeth 5B of the rows 4A, 4B are substantially arranged in planes perpendicular to the axis xx', these planes being the same for the fixed teeth 5A and the movable teeth 5B. For purposes of simplification of the drawing, FIG. 2 shows only two grooves 8, two threads 9, and a single plane 9 (shown in dot-dash line). As a result of the orientation of the teeth 5 in planes P, each thread 9 contacts the drum 2 substantially parallel to the planes P along a circle of axis xx' between pairs of fixed teeth 5A and between pairs of movable teeth 5B.

Upon the rotation of the drum 2 from the place A, there takes place a displacement of the movable teeth 5B in the direction indicated by the arrows F5, which causes a deformation of the threads driven by the teeth 5B and these threads 9 are no longer circular on the drum 2 but assume a sinuous shape.

The threads 9, driven by the rotation F2 of the drum 2, arrive at the roller 10 which permits the application of the support 11 by calendering on the drum 2. The means for feeding the roller 10 on support 11 are known and have not been shown in the drawing for purposes of simplification of the drawing. The roller 10 has grooves 12 which are directed along the generatrices of the roller 10. The arrangement of the grooves 12 on the roller 10 is such that at the place where the roller 10 applies the support 11 onto the drum 2, the teeth 5A, 5B pass through the support 11 and are arranged in the grooves 12, without touching the roller 10. This place is marked B in FIG. 1. For simplicity of the drawing, the arrival of the support 11 is not shown in FIG. 2 and a single groove 12 is shown in FIGS. 1 and 2.

The ply 13 formed by the support 11 and the sinuous threads 9 applied onto said support then passes between the roller 10 and an extraction roller 14 and the ply 13 is wound on the reel 15 which is driven by the motor 16. The axes of the rollers 10, 14 and of the reel 15 are not provided with reference numbers in the drawing and are parallel to the axes xx', yy'.

The advancing movements of the threads 9, the support 11 and the ply 13 are represented by the arrows F9, F11 and F13 respectively, in FIG. 1.

Figure 3:
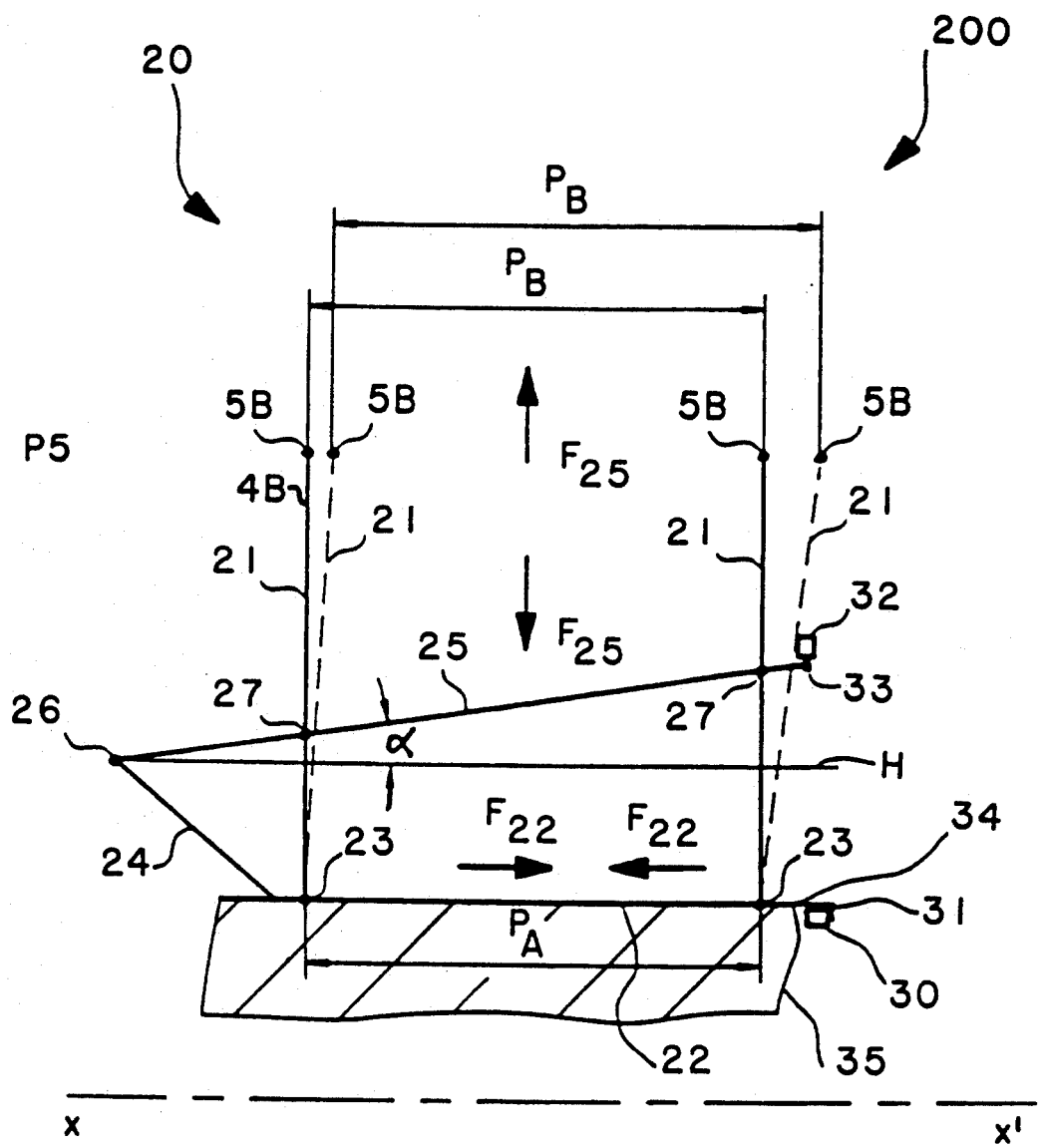
FIG. 3 shows a part of the displacement means of the device shown in FIGS. 1 and 2.
Figure 4:
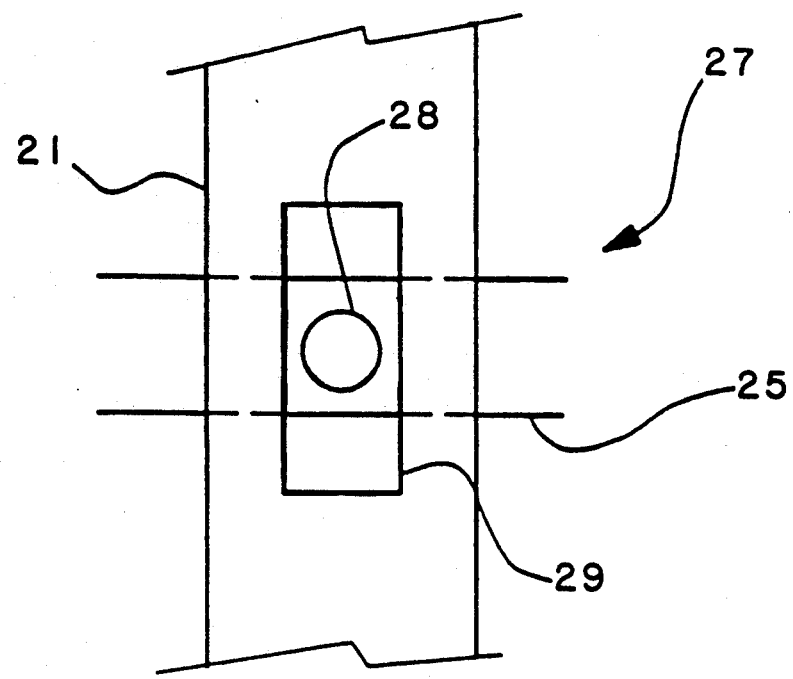
FIG. 4 shows, in greater detail, an articulation of the displacement means shown in part in FIG. 3.

The means 20 which permit the displacement of the movable teeth 5B are shown in part in FIG. 3. The movable teeth 5B corresponding to a row 4B constitute the ends of connecting rods 21 which are connected to a bar 22 by swivel joints 23 which make it possible to incline the connecting rods 21 with respect to the bar 22. The bar 22 is parallel to the axis xx' in the part thereof where the swivel joints 23 are located, and it comprises a bent end 24 which is connected to a lever 25 by an articulation 26. The connecting rods 21 are also connected to the lever 25 by articulations 27. FIG. 4 shows such an articulation 27 in greater detail. This articulation 27 is formed by a spur 28 fastened on the lever 25 and penetrating into an opening 29 provided in the connecting rod 21 so as to permit displacement of the spur 28 in the direction of the length of the connecting rod 21. The cam 30 acts on the end 31 of the bar 22 so as to displace, as a unit, the assembly 200 formed of the connecting rods 21, the bar 22, the lever 25, the swivel joints 23 and the articulations 26, 27, this displacement, which is diagrammatically indicated by the arrows F22 in FIG. 3, being parallel to the axis xx'.

The cam 32 acts on the end 33 of the lever 25, which makes it possible to incline the connecting rods 21 with respect to the bar 22 due to the articulations 23, 26, 27. The displacement of the lever 25 is diagrammatically indicated by the arrows F25 in FIG. 3. The connecting rods 21 are perpendicular to the axis xx' when the cam 32 is without action on the lever 25, and these connecting rods are inclined by an angle other than 90° with respect to the axis xx' when the cam 32 acts on the lever 25.

The bar 22 is displaced parallel to the axis xx', being guided in a groove 34 in the hub 35 of the drum 2, a return spring, not shown in the drawing, permitting the return of the bar 22 to its initial position when it is not subjected to the action of the cam 30.

The connecting rods 21 are guided by the groove 6 corresponding to the row 4B of these connecting rods, this groove being parallel to the axis xx' so that the assembly 200 corresponding to said row 4B is arranged in a plane P5 (plane of FIG. 3) containing the axis xx'. The arrangement is similar for the other rows 4B, that is to say, there are as many assemblies 200 as rows 4B.

In order to simplify the description, it has been assumed that each connecting rod 21 is extended by a single tooth 5B, but the invention applies in the event that each connecting rod 21 is extended by several teeth arranged in the plane P5.

FIGS. 5 and 6 each show portions of four threads 9 arranged on the drum 2 upon the production of the ply 13, at the point B, that is to say, at the time that the support 11 is applied against the threads 9. In FIGS. 5 and 6, the longitudinal direction, that is to say the average direction of the threads 9, corresponding to circles of the drum 2 of axis xx', is represented by $F_l$ and the transverse direction, corresponding to the generatrices of the drum 2, is represented by the arrow $F_t$.

The threads 9 of FIGS. 5 and 6 all have a sinuous shape. By definition, the ratio T of the thread 9 is the ratio between, on the one hand, the length of a portion of thread assumed linear and, on the other hand, the linear distance between the ends of said portion when the thread has a sinuous shape. In FIGS. 5 and 6, the threads 9 have substantially linear portions between two successive teeth 5A, 5B in contact with each of these threads. In these FIGS. 5 and 6, the length of thread between a tooth 5A and a following tooth 5B is represented by "a" and the distance between two successive teeth 5A, or between two successive teeth 5B, is represented by 2b, "b" representing the distance between two successive rows 4A, 4B, this distance being constant over the entire periphery of the drum 2. In this case, one, therefore, has $T = a/b$. In these FIGS. 5 and 6, the distance between two successive fixed teeth 5A of the same row 4A is represented by $P_A$ and the distance between two successive movable teeth 5B of the same row 4B is represented by $P_B$.

In FIG. 5, one has $P_A = P_B$, so that the ratio T is the same for all the threads 9, since "a" has the same value for all the threads 9.

In FIG. 6, $P_A$ and $P_B$ are different, so that the value "a" varies from one thread to the other, that is to say, the ratio T varies from one thread to the other.

On the finished ply, the threads 9 have retained practically the same arrangement as they had just before the withdrawal of the teeth 5 due to the rotation of the drum 2, that is to say, the peaks S of the sinuous paths of the threads 9 correspond substantially to the prior position of the teeth 5A, 5B.

When the means 20 are placed in operation so that the cam 30 acts on the bar 22 without the cam 32 acting on the lever 25, the connecting rods 21 remain perpendicular to the bar 22 which is parallel to the axis xx', that is to say, the distance $P_B$ remains equal to the distance $P_A$ upon the displacement, all the threads 9 then having the same ratio in the ply 13, as shown in FIG. 5. When the means 20 are placed in operation so that one has not only action of the cam 30 on the bar 22 but also action of the cam 32 on the lever 25, then, as a result of the articulations 23, 26, 27, the connecting rods 27 are inclined and are no longer perpendicular to the bar 22 and the distance $P_B$ is no longer equal to the distance $P_A$.

For purposes of simplification of the drawing, only two successive connecting rods 21 have been shown in FIG. 3. These connecting rods are shown in solid lines when they are perpendicular to the bar 22 and in dashed lines when they are inclined by an angle other than 90° with respect to the axis xx, as a result of the action of the cam 32.

In FIG. 3, the distance between the two articulations 23 corresponds to the distance $P_A$, this distance being the same all along the entire bar 22 for any two successive connecting rods 21. When the connecting rods 21 are perpendicular to the bar 22, the distance $P_B$ is equal to the distance $P_A$. When the connecting rods 27 are inclined, the distance $P_B$ is no longer equal to the distance $P_A$ but, in any event, due to the structure of the articulation 27, one still has a constant value $P_B$ between any two adjacent teeth 5B, even when the connecting rods 21 are inclined. The means 20 permit varying $P_B$ easily by acting on the angle $\alpha$ which the lever 25 forms with the straight line H parallel to xx' and passing through the articulation 26.

The invention has the following advantages:
- one operates continuously, without stopping the rotation of the drum 2, which makes it possible to have high speeds which can, for instance, reach or exceed 5 meters per minute;
- one obtains a ply 13 the threads 9 of which are arranged with great uniformity on the support 11, the variation of the ratio T of each thread being at most equal to 1% and preferably at most equal to 0.5% plus or minus with respect to any nominal value $T_n$ selected for this thread;
- the nominal ratio $T_n$ may vary within wide limits from one thread 9 to the other of the ply 13, this ratio being, for instance, greater than 1 and less than 3;
- due to the great precision of the ratios T for the ply 13, the latter is characterized by well-defined mechanical properties in the article in which it is incorporated, for instance a tire, even if said article is subjected to shaping upon its manufacture;
- the variation of the ratio $T_n$ is very easy to obtain and one can, therefore, rapidly modify this ratio upon manufacture so as to have a variation of $T_n$ not only in the transverse direction, that is to say, parallel to the axis xx', but also in the longitudinal direction, for example upon adjustments of the device, that is to say, in the direction of the passage of the thread 9 and the support 11.

It is possible to do away with the sinuous shape of the threads 9 upon the shaping of the article in which the ply 13 is used, in the manner described in the aforementioned EP Application A 318 791.

The threads 9 are preferably textile threads of a diameter of from 0.2 to 2 mm.

The support 11 is, for example, a band of unvulcanized rubber; upon the production of the ply 13, the support 11 of this ply 13 being, in particular, then vulcanized, for instance upon the vulcanization of a tire in which the ply 13 is incorporated.

The invention also covers the cases in which the decrease in the nominal ratio $T_n$ is reversible, for instance in the case of a membrane formed of a ply in accordance with the invention having an elastic support, the deformation of said membrane, for instance under the effect of the pressure of a fluid, causing a decrease in said ratio, but the threads resuming their initial ratio $T_n$ when the membrane resumes its initial shape. This membrane, made, for instance, of vulcanized rubber, can serve, in particular, for the building, shaping or vulcanizing of tires.

The invention is, of course, not limited to the embodiments which have been described above. Thus, for instance, one can have cases in which all the teeth are movable, the teeth being subject to relative movements between them, and cases in which the teeth are not disposed in rows.

I claim:

1. A method of applying a plurality of threads on a support in such a manner as to obtain a ply while imparting a sinuous shape to the threads, the method being carried out by a device in which a drum is turned around an axis and the drum comprises rows of teeth, each row being parallel to the axis of rotation of the drum, the rows all having the same number of teeth, and every second row is such that its teeth are fixed, the other rows being such that their teeth are movable in a direction parallel to the axis of rotation of the drum, said method comprising bringing the threads into contact with the drum, at a place where the fixed and movable teeth are aligned substantially in planes perpendicular to the axis of rotation of the drum, said planes being the same for the fixed teeth and the movable teeth, the threads being disposed parallel to said planes between pairs of teeth in the rows of fixed or movable teeth, advancing the threads by the rotation of drum and displacing in the movable teeth so that they displace the threads in contact with them so as to impart a sinuous shape to the threads on the drum, bringing the support into contact with the drum and the threads at a place where the threads have substantially acquired their final sinuous shape on the drum, and removing the ply formed of the support and the threads in contact with the support from the drum.

2. A method according to claim 1, in which the movable teeth constitute the ends of cam operated connecting rods and the displacement of the movable teeth is obtained by displacing the connecting rods by means of a cam.

3. A method according to claim 1 in which a distance $P_A$ between two successive fixed teeth of the same row is constant over the entire drum and the displacement of the movable teeth is effected in such a manner that a distance $P_B$ between two successive movable teeth of the same row is constant over the entire drum.

4. A method according to claim 3, in which the displacement of the movable teeth is effected in such a manner that $P_A = P_B$.

5. A method according to claim 3, in which the displacement of the movable teeth is effected in such a manner that $P_A$ is different from $P_B$.

6. A device for applying a plurality of threads on a support so as to obtain a ply, while imparting a sinuous shape to the threads, the device comprising: a drum rotatable about an axis; rows of teeth on said drum, each row being parallel to the axis of rotation of the drum, the rows all having the same number of teeth; displacement means for moving the teeth of every second row parallel to the axis of rotation of the drum, the teeth of every other row being fixed; means for bringing the threads into contact with the drum at a place where the fixed and movable teeth are aligned substantially in planes perpendicular to the axis of rotation of the drum, these planes being the same for the fixed teeth and the movable teeth, the threads being arranged parallel to said planes between pairs of teeth in the rows of fixed or pairs of movable teeth, displacement means for displacing the threads carried by the drum so as to impart a sinuous shape to the threads on the drum; means for bringing the support in contact with the drum and the threads at a place where the threads have substantially acquired their final sinuous shape on the drum; and means for removing the ply formed by the support and the threads in contact with the support from the drum.

7. A device according to claim 6, in which the displacement means comprises, for each row of movable teeth, an assembly including connecting rods, the ends of which constitute the movable teeth, a bar to which the connecting rods are connected by articulations, a lever to which the connecting rods are connected by articulations, the lever and the bar being connected by an articulation, the displacement means further comprising cam means acting on the bars and on the levers, the cam means acting independently on each bar, displacing the assembly parallel to the axis of rotation of the drum and the cam means acting on each lever imparting inclination of the connecting rods of said assembly by an angle other than 90° with respect to the axis of rotation of the drum, the connecting rods being perpendicular to the axis of rotation of the drum when the levers are not subjected to the action of the cam means.

8. A device according to claim 7, in which a distance between two successive rows of fixed teeth and movable teeth is constant over the entire periphery of the drum, a distance $P_A$ between two successive fixed teeth of the same row is the same for all the fixed teeth and a distance $P_B$ between two successive movable teeth of the same row is the same for all the movable teeth, $P_A$ and $P_B$ being equal when the levers are not subjected to the action of the cam means in contact with them, $P_A$ and $P_B$ being different when the levers are subjected to the action of said cam means.

9. A method of applying a plurality of threads on a support to obtain a ply comprising laying a plurality of threads on the outer surface of a rotating drum, engaging the threads on the drum with relatively movable thread displacing teeth to impart a sinuous shape to the threads on the drum, bringing the support into contact with the drum and the threads after the threads have had imparted to them a sinuous shape and removing the ply formed of the support and the threads from the drum.

10. A device for applying a plurality of threads on a support to obtain a ply comprising a rotatable drum, means for advancing a plurality of threads to the surface of the drum, relatively movable thread displacing for engaging and displacing the threads on the drum and imparting to them a sinuous shape, means for bringing the support into contact with the drum and the threads after the threads have had imparted to them a sinuous shape and means for removing the ply formed of the support and threads from the drum.

* * * * *

UNITED STATES PATENT AND TRADEMARK OFFICE
CERTIFICATE OF CORRECTION

PATENT NO. : 5,242,520
DATED : Sept. 7, 1993
INVENTOR(S) : Carrier

It is certified that error appears in the above-identified patent and that said Letters Patent is hereby corrected as shown below:

Col. 1, line 62, " , in" should read --in--. Col. 4, line 3, "plane 9" should read --plane P--. Col. 5, line 67, "ply !3" should read --ply 13--. Col. 6, line 3, "rods 27" should read --rods 21--; line 11, "axis xx, " should read --axis xx' --; line 18, "rods 27" should read --rods 21--. Col. 7, line 27, "the, drum, " should read --the drum--; line 47, "3.3" should read --3.--. Col. 8, line 9, "pairs of movable" should read --movable--; line 26, "bar, " should read --bar--; line 58, "displacing" should read --displacing teeth--.

Signed and Sealed this

Twelfth Day of April, 1994

Attest:

BRUCE LEHMAN

*Attesting Officer*   *Commissioner of Patents and Trademarks*